Dec. 9, 1958 HIROSHI MITO 2,863,713
PANORAMA CAMERA
Filed Dec. 19, 1955 2 Sheets-Sheet 1

INVENTOR:
HIROSHI MITO
BY Richardson, David and Nardon
ATTORNEYS.

Dec. 9, 1958

HIROSHI MITO 2,863,713

PANORAMA CAMERA

Filed Dec. 19, 1955

INVENTOR:
HIROSHI MITO

BY
Richardson, David and Nardon
ATTORNEYS.

United States Patent Office 2,863,713
Patented Dec. 9, 1958

2,863,713
PANORAMA CAMERA

Hiroshi Mito, Akigun, Japan

Application December 19, 1955, Serial No. 554,062

Claims priority, application Japan December 22, 1954

3 Claims. (Cl. 95—16)

The present invention relates to a panorama camera and more particularly to a panorama camera characterized in that the film feeding spool and the exposure mechanism are operatively connected with each other.

An object of the present invention is to eliminate the risk of double exposure and to increase the speed of operation by operatively connecting the film spool and the shutter in a panorama camera.

Another object of the present invention is to make the camera comparatively small in size, light in weight and convenient to carry notwithstanding the provision of said operatively connecting means.

Still another object of the present invention is to provide a panorama camera which operates through a picture angle of approximately 360 degrees and which also permits the use of any optional picture angle of less than 360 degrees can be photographed by operatively connecting the film spool and the shutter.

The panorama camera according to the present invention is characterized in that a rotor including two reflectors, a lens set, shutter means and diaphragm means, a film holding rotary frame to hold a film cylindrically with the axis of said rotor as the center and film spooling means to wind the film on said film holding rotary frame are contained in the body of the camera, said rotor and said film spooling means being operatively connected with each other.

Now, the panorama camera of the present invention shall be more specifically described with reference to the accompanying drawings.

Figure 1:
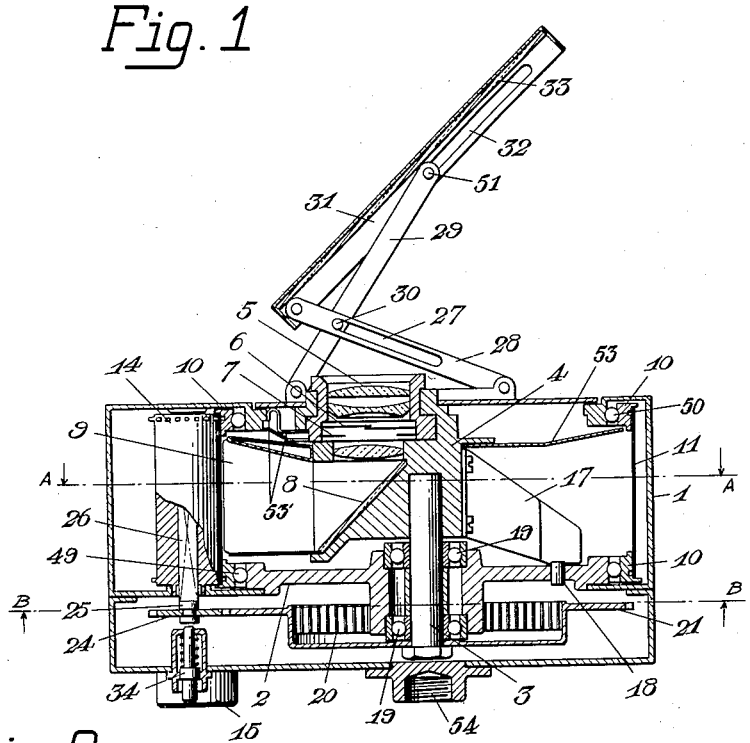
Fig. 1 is a longitudinal sectional view of a panorama camera according to the present invention.
Figure 2:
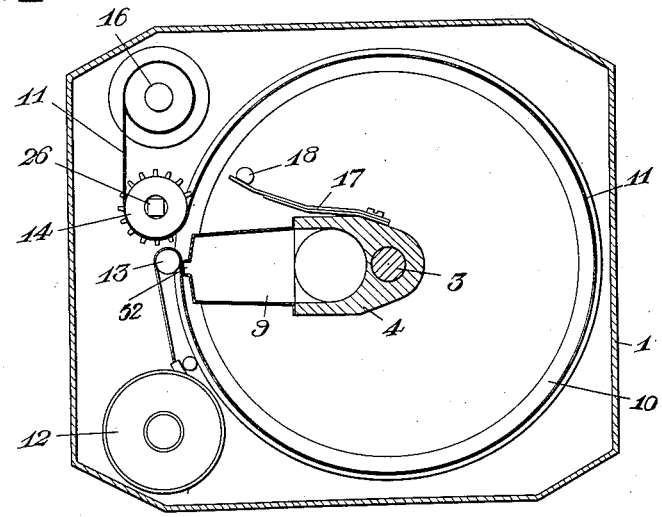
Fig. 2 is a plan sectional view on line A—A in Fig. 1.
Figure 3:
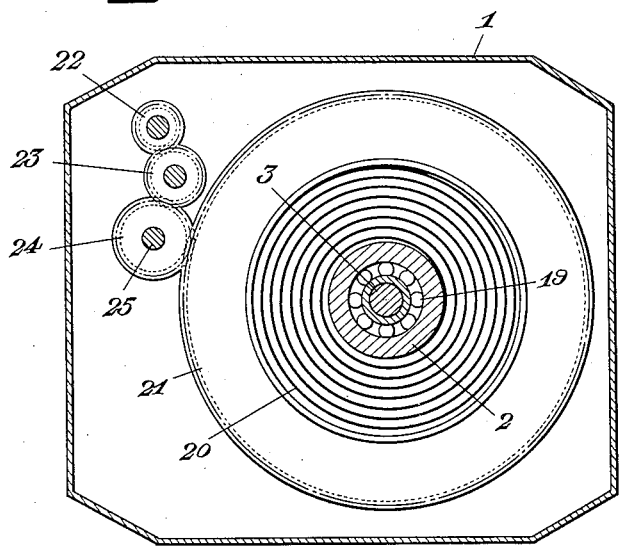
Fig. 3 is a transverse bottom sectional view on line B—B in Fig. 1.

In Figs. 1, 2 and 3, a rotor 4 carries two reflectors 33 and 8, a lens set 5, a shutter mechanism 6 and a diaphragm 7 is provided within the body 1 of a camera so as to be rotatable by the revoluble vertical shaft 3 of the rotor 4 being journaled in ball bearings 19 with respect to the bearing case 2 which is fixed to the camera body 1. A film winding frame 10 is provided within the camera body 1 so as to be rotatable through ball bearings 49 provided on the outer periphery of the bearing case 2 concentrically with the shaft 3 of the rotor 4. In this case, the radius of the film winding frame 10 is made equal to the focal length of the lens set 5. As illustrated in Fig. 1, the upper reflector 33 is fixed to a reflector support 31 and the lower reflector 8 is fixed to the rotor 4 so as to be inclined at an angle of 45 degrees to the axis of the shaft 3 of the rotor 4 and so that the center of the reflector surface may be at the center of the optical axis of the lens set 5. The reflector support 31 is collapsibly supported by intersecting stays 28 and 29 and is so constructed as to constitute a lid for the camera body 1 when folded and that the upper reflector 33 may be parallel with the lower reflector 8 and thus may be exactly at an angle of 45 degrees to the optical axis of the lens set 5 when the supporter 31 is elevated as shown in Fig. 1 of the drawing. 27 is a slot in the stay 28; 30 is a projection provided on the stay 29 and slidably engaged in said slot 27; 32 is a slot made in the side flange of the reflector supporter 33; 51 is a projection provided on the stay 29 and slidably engaged in said slot 32.

A spiral clock spring 20 is arranged to surround the lower part of the bearing case 2. One end of said spiral spring 20 is fixed to the bearing case 2 and the other end is fixed to the inside of a larger gear body 21 which, in turn, is fixed to the lower end of the shaft 3 of the rotor 4. 9 is a light-proof box fixed to the rotor 4. A slit 52 is provided in the end wall of said box 9 which is adjacent to the surface of the film 11 supported on a film winding frame 10 (see Figs. 1 and 2). One end of a leaf spring stop member 17 is fixed to one side of the rotor 4 and the other end is engageable with a stud 18 fixed to the bearing case 2 when the rotor 4 stops. Further, the rotor 4 is provided with baffles 53 and 53' which prevent light from entering the camera body 1 from outside. The film winding frame 10 is arranged to be freely rotatable by means of ball bearings 50 provided between the camera body 1 and the bearing case 2.

In Figs. 1, 2 and 3, 12 is a film supply cartridge, 13 is a guide roller, 14 is a film-feeding sprocket wheel to feed the film by utilizing the holes of the film, and 16 is a film take-up spool. A square shaft 26 which is free to move vertically is set in the center of the sprocket wheel 14. A pinion 24 is secured to the lower end 25 of the square shaft 26 so that the teeth of the pinion 24 mesh with the teeth of the large gear 21. The square shaft 26 may move upwardly to disengage the gear 21 by being pressed by a shutter button 34. A pinion 22 is provided on the film take-up spool 16 so as to be driven by said pinion 24 provided on the sprocket wheel 14 through an idler pinion 23 provided between them. 15 is a winding knob for the film take-up spool 16 and 54 is a threaded hole for attaching a tripod.

The operation of the panorama camera according to the present invention is as follows:

As shown in Fig. 2, the film is first set in the supply cartridge 12, is then led out of the cartridge 12 and is wound around the guide roller 13, film winding frame 10, sprocket wheel 14 and film take-up spool 16 in the order mentioned. (It is preferable in this case to avoid waste of unexposed film by connecting scrap film or inexpensive material to the free end of the film led out of the supply cartridge 12 to be wound as mentioned when loading the camera.) When the film take-up spool 16 is rotated by means of knob 15, the pinion 22 will drive pinion 24 of the sprocket wheel 14 through the idler pinion 23, the film 11 will therefore progress and at the same time the sprocket wheel pinion 24 will drive the large gear body 21. This winds the clock spring 20 so that the rotor 4 can be rotated by the rotating shaft 3 by nearly 360 degrees anticlockwise as seen in Fig. 2 by unwinding of the spiral clock spring 20. Further, when the reflector supporter 31 is held up, as the angle of inclination of the reflector 33 is 45 degrees, an image reflected by said reflector 33 will be bent at right angles on the reflector 33, will pass downwardly through the lens set 5, will be reflected by the lower reflector 8, will be bent at right angles on the surface of the reflector 8, will pass through the slit 52 and will be photographed on the sensitive film surface of the film 11. Thus, as the radius of the film winding frame 10 is made equal to the focal length of the lens set 5 as mentioned above, a sharp image can be focused on the sensitive film surface of the film 11.

Therefore, when the picture field is determined by looking through a proper viewfinder (not illustrated) and the shutter button 34 is pushed, the mesh of the teeth of the pinion 24 and those of the large gear body 21 will be disengaged, and the rotor 4 will be rotated clockwise as seen in Fig. 2 by the unwinding of the spiral spring 20. At the same time, the shutter 6 (which is so constructed as to be fully open during the clockwise rotation of the rotor) will open and the exposure will be effected through the slit 52. The rotor 4 will be stopped upon completion of the exposure by engagement of the leaf spring 17 and the fixed stud 18. Therefore, the above mentioned operation may be repeated for the next photographing. In such case, as a fresh unexposed film portion will be wound on the film winding frame 10 and at the same time the rotor 4 will be rotated against the spiral spring 20 as operatively connected when the film is wound up as mentioned above, the camera will again be ready for an exposure. Therefore, when the shutter button 34 is pushed, the rotor 4 will be rotated by approximately 360 degrees to scan the sensitive film surface of the cylindrically wound film 11 through the slit 52 and said sensitive film surface will be exposed to the light of the focused image. Thus, panorama photographing over a picture angle of approximately 360 degrees is advantageously provided.

Figure 4:
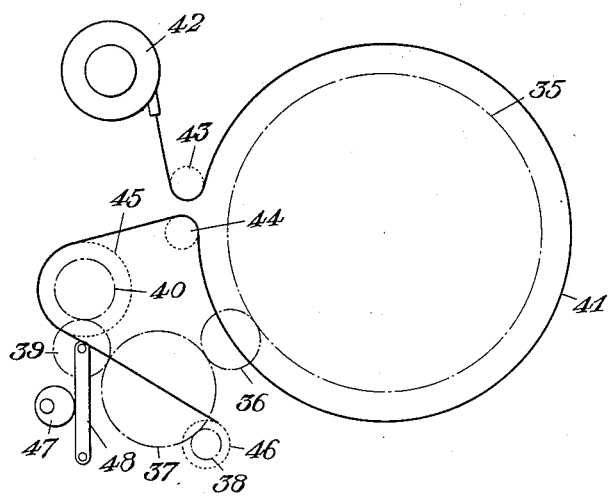
Fig. 4 is a diagrammatic view showing a modified type of film spooling means.

Fig. 4 shows an example of the apparatus wherein the film feeding means and the rotor are operatively connected with each other in the case of a film having no sprocket perforations. 43 is a guide roller, 44 is a guide roller, 45 is a film feeding friction wheel arranged to prevent slippage of the film and 46 is a film take-up spool. A film 41 is wound up on the film spool 46 after threading the same through said members in the order mentioned from the supply cartridge 42. A large gear body 35 of the rotor meshes with an idler pinion 36 which, in turn, meshes with a medium size gear 37. Furthermore, said medium gear 37 meshes simultaneously with a unidirectionally rotatable idler pinion 39 and with a drive pinion 38 fixed to the shaft of the film take-up spool 46. Said pinion 38 is so arranged as to mesh through the reverse rotation preventing idler gear 39 with the pinion 40 fixed to the film feeding friction wheel 45 and as to be disengaged therefrom by a cam 47 and a lever 48. Therefore, if the film spool 46 is rotated manually to wind film, the pinion 38 fixed thereto will rotate and the medium gear 37 in mesh with said pinion 38 will also rotate. By the rotation of said medium gear 37, the rotor will be rotated through the pinion 36 and the large gear body 35. At the same time, the reverse rotation preventing gear 39 in mesh with the medium gear 37 will rotate. Further, as said gear 39 is in mesh with a gear 40 of the film feeding friction wheel 45, said film feeding friction wheel 45 will rotate. Thereby the film 41 will be wound on the film take-up spool 46 through the guide roller 43, around film winding frame, guide roller 44 and film feeding friction wheel 45 from the supply cartridge 42. As the film 41 will progress due to the friction of the film feeding wheel 45 and at the same time the rotor will rotate as operatively connected as mentioned above, the operative connection in the present invention can be accomplished even with a film having no sprocket perforation. In the photographing operation, when the mesh of the pinion 36 with the large gear body 35 and medium gear 37 is disengaged by operation of the shutter button, only the rotor will rotate and thus the exposure will be completed. The provision of the cam 47 and lever 48 is to disengage the mesh of the reverse rotation preventing idler gear 39 when unwinding exposed film.

As described above, according to the present invention, the operative connection of the film spool and the shutter in a panorama camera can be accomplished with a simple mechanism, therefore double exposure can be avoided and the camera can be made small in size, light in weight and convenient to carry. Thus, with the panorama camera of the present invention, not only a picture angle of approximately 360 degrees can be panoramically photographed but also, if the feeding of the film is stopped at any optional intermediate point, the rotor will rotate only through the range of feeding of the unexposed film and therefore a picture field in any optional range of less than 360 degrees can be photographed.

What is claimed is:

1. A panoramic camera comprising a body having a rotor and means for driving same, lens, diaphragm and shutter mechanism carried by said rotor, means for supporting a film for exposure about said rotor including a film feeding spool, said spool being operatively connected to said rotor driving means, means for disconnecting said spool from said driving means, a closure for said lens hinged to said rotor, and a reflector on said closure adapted to direct an image to said lens when the closure is spaced from said lens.

2. A panoramic camera comprising a body, a rotor mounted in said body, spring means yieldingly urging said rotor to a predetermined fixed position of rotation, lens, diaphragm and shutter mechanism carried by said rotor, means for supporting a film for exposure about said rotor, a film feeding spool for replacing exposed film on said supporting means with unexposed film, releasable means connecting said rotor to be driven with said spool to wind said spring means during the feeding of unexposed film, a closure for said lens hinged to said body, and a reflector carried by said closure and adapted to direct an image to said lens when said closure is angularly inclined with respect to the rotational axis of said rotor.

3. A panoramic camera comprising a body, a rotor mounted in said body, said rotor having a vertical axis of rotation, an optical system carried by said rotor and having its axis parallel to and spaced from said axis of rotation, freely revoluble film supporting means coaxial with said rotor, a mirror carried by said rotor, said mirror reflecting light fom said optical system onto said film, the focal length of said optical system being such as to focus an image to be photographed on a film supported by said supporting means, spring means yieldingly urging said rotor in a predetermined direction of rotation, stop means for stopping rotation of said rotor at a predetermined angular position, film feeding means including a film feeding spool for supplying unexposed film to said film supporting means, disengageable means interconnecting said spool and said rotor to wind said spring during film feeding operation of said spool, means for releasing said disengageable means to cause unwinding of said spring accompanied by rotation of said rotor to said predetermined position, a closure member for said optical system pivotally connected to said rotor, a mirror carried by said closure member, and means for limiting the outward movement of said closure member to cause said mirror to reflect light received from a horizontal direction axially into said optical system.

References Cited in the file of this patent

UNITED STATES PATENTS

| | | |
|---|---|---|
| 511,133 | Fretwell | Dec. 19, 1893 |
| 687,592 | Barnell | Nov. 26, 1901 |
| 726,356 | Schober | Apr. 28, 1903 |
| 780,382 | Reavill | Jan. 17, 1905 |
| 866,257 | Case | Sept. 17, 1907 |
| 867,396 | Muller | Oct. 1, 1907 |
| 2,148,011 | Burke | Feb. 21, 1939 |

FOREIGN PATENTS

| | | |
|---|---|---|
| 6,870 | Switzerland | May 23, 1893 |